(12) United States Patent
Koseoglu et al.

(10) Patent No.: US 12,005,486 B2
(45) Date of Patent: Jun. 11, 2024

(54) METHOD TO REMEDIATE CONTAMINATED SOIL

(71) Applicant: Saudi Arabian Oil Company, Dhahran (SA)

(72) Inventors: Omer Refa Koseoglu, Dhahran (SA); Robert Peter Hodgkins, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 94 days.

(21) Appl. No.: 17/574,883

(22) Filed: Jan. 13, 2022

(65) Prior Publication Data

US 2023/0219124 A1 Jul. 13, 2023

(51) Int. Cl.
| | | |
|---|---|---|
| *B09C 1/00* | (2006.01) | |
| *B09C 1/02* | (2006.01) | |
| *B09C 1/08* | (2006.01) | |

(52) U.S. Cl.
CPC . *B09C 1/02* (2013.01); *B09C 1/08* (2013.01)

(58) Field of Classification Search
CPC .......... B09C 1/02; B09C 1/08; B09C 2101/00
See application file for complete search history.

(56) References Cited

U.S. PATENT DOCUMENTS

| | | | | |
|---|---|---|---|---|
| 5,476,992 A | * | 12/1995 | Ho | E21B 43/2401 |
| | | | | 588/302 |
| 6,160,194 A | | 12/2000 | Pignatello | |
| 6,264,399 B1 | | 7/2001 | Grisso et al. | |
| 6,326,187 B1 | | 12/2001 | Jones et al. | |
| 9,656,311 B2 | | 5/2017 | Zhang et al. | |
| 10,131,557 B2 | | 11/2018 | Safarzdeh-Amiri et al. | |
| 10,807,947 B2 | | 10/2020 | Koseoglu et al. | |
| 2007/0116524 A1 | * | 5/2007 | Shiau | C09K 8/584 |
| | | | | 405/128.15 |
| 2010/0078372 A1 | * | 4/2010 | Kerfoot | B01F 23/23231 |
| | | | | 210/150 |
| 2010/0185039 A1 | * | 7/2010 | Hoag | B09C 1/08 |
| | | | | 210/721 |
| 2012/0187051 A1 | | 7/2012 | Setier et al. | |
| 2015/0273546 A1 | * | 10/2015 | Robinson | B01F 23/451 |
| | | | | 210/170.07 |
| 2018/0056345 A1 | * | 3/2018 | Min | B09C 1/08 |
| 2018/0118590 A1 | * | 5/2018 | Wright | B01J 27/188 |
| 2021/0130201 A1 | * | 5/2021 | Kerfoot | B09C 1/08 |
| 2021/0387879 A1 | * | 12/2021 | Griffiths | C02F 1/725 |

OTHER PUBLICATIONS

Cartwright, "Evaluation of Contaminated Soil Remediation Technologies of Petroleum Refineries", National Petroleum Refiners Association (AM-91-23), 1991 NPRA Annual Meeting, Mar. 17-19, 1991.

Morgott et al., "Disulfied Oil Hazard Assessment Using Categorical Analysis and a Mode of Action Determination", International Journal of Toxicology, vol. 33(Supplement 1), pp. 181S-198S, 2014.

* cited by examiner

*Primary Examiner* — Carib A Oquendo
(74) *Attorney, Agent, or Firm* — Dinsmore & Shohl LLP

(57) ABSTRACT

The present disclosure is directed to methods of remediating contaminated soil. The methods may include mixing an oxidant, a catalyst, and optionally a phase transfer agent to form an oxidant mixture, applying the oxidant mixture onto the contaminated soil, washing the contaminated soil with a washing solution, inserting vacuum pipes into the contaminated soil, and vacuuming the contaminated soil to remove at least one of the oxidation mixture, contaminants, or oxidation products.

18 Claims, No Drawings

METHOD TO REMEDIATE CONTAMINATED SOIL

TECHNICAL FIELD

The present disclosure relates to methods for remediating contaminated soil.

BACKGROUND

Many industrial processes produce chemical byproducts that can be harmful to the environment if not properly disposed. If chemical byproducts contaminate soil, the chemical byproducts must be removed from the soil to avoid harm to waterways, roadways, buildings, flora, or fauna.

SUMMARY

Many soil contaminants, including sulfide and disulfide contaminants, are difficult to remediate with conventional soil remediation methods. For example, thermal desorption is usually not viable for high boiling point polynuclear aromatic hydrocarbons; incineration may be costly; organic solvent extraction creates large quantities of organic waste; surfactant soil washing is not ideal for high molecular weight polynuclear aromatic hydrocarbons because they are difficult to emulsify; and land farming may present the threat of contaminant runoff onto uncontaminated soil. Furthermore, conventional methods of soil remediation do not specifically remediate soil contaminated with sulfides and disulfides.

Accordingly, an ongoing need exists for methods of soil remediation for soils contaminated with sulfides and disulfides that are efficient, affordable, and do not produce waste products that are difficult to dispose. The present embodiments address these needs by providing methods of soil remediation for contaminated soil.

In one embodiment, the present disclosure relates to methods for treating contaminated soil. The methods include mixing an oxidant and a catalyst to form an oxidant mixture and applying the oxidant mixture onto the contaminated soil. The methods further include washing the contaminated soil, inserting vacuum pipes into the contaminated soil, and vacuuming the contaminated soil to remove at least one of the oxidation mixture, contaminants, or oxidation products.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

Features and advantages of the embodiments will now be described with occasional reference to specific embodiments. However, the embodiments may include different forms and should not be construed as limited to the embodiments set forth herein. Rather, these embodiments are provided so that this disclosure will be thorough and complete and will fully convey the scope of the disclosure to those skilled in the art.

As used throughout this disclosure the term "mixing" refers to combining two or more substances together to create a mixture. While the mixing may be homogeneous so that each substance in the mixture is evenly spread throughout the mixture, the mixing may also be heterogeneous so that at least some of the substances are not evenly spread throughout the mixture.

As used throughout this disclosure the term "mixture" refers to a substance made from mixing two or more substances together. In some instances, the substances mixed together do not chemically combine. As a non-limiting example, hydrogen peroxide, sodium tungstate, and acetic acid may be added to a container or tank and mixed by stirring the hydrogen peroxide, sodium tungstate, and acetic acid with a glass stirring rod so that the hydrogen peroxide, sodium tungstate, and acetic acid are homogenously distributed.

As used throughout this disclosure, the term "oxidation number" is used to define the electric charge an atom would have if the bonding electrons were assigned exclusively to the more electronegative atom.

As used throughout this disclosure the terms "oxidant" "and "oxidizing agent" are used interchangeably and refer to a substance that tends to bring about oxidation by being reduced and gaining electrons. As a non-limiting example, a sample reaction is shown below. One mole of dimethydisulfide molecule reacts with four moles of hydrogen peroxide to yield dimethyl disulfone as a product and water as by-product.

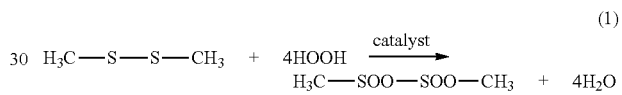

(1)

As used throughout this disclosure the phrase "oxidant mixture" refers to a mixture that includes (or at one time included) an oxidant.

As used throughout this disclosure the term "reductant" and "reducing agent" are used interchangeably and refer to a substance that tends to bring about reduction by being oxidized and losing electrons.

As used throughout this disclosure the phrase "oxidation product" or "oxidation products" refers to the chemical product that results from an oxidation reaction. As a non-limiting example, referring again to the above reaction, the dimethyl-disulfone is the oxidation product.

As used throughout this disclosure the term "phase transfer agent" refers to any substance that wholly or partially aids in the migration of one substance from one phase to another phase. As a non-limiting example, a phase transfer agent might aid in the migration of a substance from an organic phase to an aqueous phase.

As used throughout this disclosure the term "catalyst" refers to a substance that increases the rate of a chemical reaction without itself undergoing any permanent chemical change.

As used throughout this disclosure the term "contaminated" refers to anything that has been exposed to or includes any amount of a polluting substance. Polluting substance may refer to any substance that can adversely affect plants, waterways, roadways, buildings, structures, fish, birds, reptiles, amphibians, fungi, bacteria, archaea, arachnids, crustaceans, insects, mammals, humans, or other living organisms.

As used throughout this disclosure the term "soil" refers to anything that is or once was part of the upper layer of earth in which plants grow, sometimes comprising a mixture of organic remains, clay, sand, silt, and rock particles.

As used throughout this disclosure the term "spraying" refers to applying, contacting, at least partially covering, or at least partially coating a substrate with a fluid in the in the form of droplets. As a non-limiting example, a contaminated soil may be sprayed with an oxidant mixture by placing an oxidant mixture in a container or tank that is connected to tubing. Pressure may be used to force the oxidant mixture into the tubing, and then the oxidant mixture may be released out of the tubing so that the oxidant mixture falls on the soil in droplets. An apparatus that allows control of the size of the droplets released from the tubing may be attached to the tubing to control the droplet size of the oxidant mixture.

As used throughout this disclosure the term "washing" refers to cleansing by the action of a substance. As a non-limiting example, soil may be washed with water by applying water to the soil, allowing soil contaminants to dissolve in the water and then removing the water from the soil. In some instances, the water may be removed by vacuuming with vacuum pipes.

As used throughout this disclosure the phrases "vacuum pipe" or "vacuum pipes" refer to any tubing or piping connected to a pump wherein the pump can create a change in pressure such that a fluid enters the tubing or piping.

As used throughout this disclosure the term "vacuuming" refers to using anything that creates a change in pressure so that a fluid enters a vacuum pipe. As a non-limiting example, a motor might be used to create a decrease in pressure inside a vacuum so that water enters the vacuum pipe.

As used throughout this disclosure the term "disperser" refers to an apparatus that distributes a fluid.

As used throughout this disclosure the term "alkyl" refers to a branched alkane radical or an unbranched alkane radical.

As used throughout this disclosure the term "aryl" refers to an aromatic ring structure having a radical on a carbon atom of the aromatic ring.

As used throughout this disclosure the term "alkylenearyl" refers to an alkyl-aromatic structure having a radical on a carbon of the alkyl group.

As used throughout this disclosure the term "homogenous catalyst" refers to a catalyst that exists in the same phase with the reactants.

Embodiments of the present disclosure are directed to methods for treating contaminated soil. The methods include mixing an oxidant and a catalyst to form an oxidant mixture and spraying the oxidant mixture onto the contaminated soil. The methods then include washing the contaminated soil with a washing solution, inserting vacuum pipes into the contaminated soil, and vacuuming the contaminated soil to remove at least one of the oxidation mixture, contaminants, or oxidation products, thereby treating the contaminated soil.

Mixing the oxidant mixture may include adding the oxidant and catalyst to a container or tank, as a non-limiting example, and stirring to mix the oxidant and the catalyst in the container or tank. In embodiments, mixing the oxidant and the catalyst may include shaking the container or tank to mix the oxidant and the catalyst. As an additional non-limiting example, mixing the oxidant and the catalyst may include allowing the oxidant and the catalyst to diffuse to create an oxidant mixture. In embodiments where the oxidizing agent is gaseous, only the catalyst might be placed in the container or tank and mixed, and the oxidizing agent might be allowed to diffuse into the catalyst mixture. Additionally or alternatively, in embodiments where the oxidizing agent is gaseous, the catalyst and phase transfer agent is sprayed to the soil and then the gaseous oxidizing agent is injected to the soil.

Mixing the oxidant mixture may include mixing a phase transfer agent with the oxidant and the catalyst to form the oxidant mixture. Mixing the oxidant mixture may include adding the oxidant, phase transfer agent, and catalyst to a container or tank, as a non-limiting example, and stirring to mix the oxidant, the phase transfer agent, and the catalyst in the container or tank. As an additional non-limiting example, mixing the oxidant, the phase transfer agent, and the catalyst may include shaking the container or tank to mix the oxidant, the phase transfer agent, and the catalyst. As an additional, non-limiting example, mixing the oxidant, the phase transfer agent, and the catalyst may include allowing the oxidant, the phase transfer agent, and the catalyst to diffuse to create an oxidant mixture. As an additional, non-limiting example, if the oxidizing agent is gaseous, only the phase transfer agent and the catalyst might be placed in the container or tank and mixed, and the oxidizing agent might be allowed to diffuse into the phase transfer agent and catalyst mixture.

The oxidant may include a peroxide, a peroxy acid, oxygen, air, nitrous oxide, or a combination thereof. In embodiments, the peroxide may include an alkyl hydroperoxide, an aryl hydroperoxide, an alkylenearyl hydroperoxide, a dialkyl peroxide, a diaryl peroxide, a perester, hydrogen peroxide, or combinations thereof. In further embodiments, the peroxide may have a general structure according to Formula I where $R^1$ may be hydrogen, an alkyl group, an aryl group, or an alkylenearyl group, and $R^2$ may be hydrogen, an alkyl group, an aryl group, or an alkylenearyl group. In embodiments, $R^1$ and $R^2$ may be the same or different.

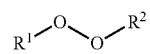

Formula I

In embodiments, the perester has the general structure according to Formula II where $R^1$ is hydrogen, an alkyl group, an aryl group, or an alkylenearyl group, and $R^2$ hydrogen, an alkyl group, an aryl group, or an alkylenearyl group. In embodiments, $R^1$ and $R^2$ may be the same or different.

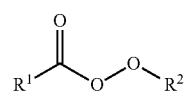

Formula II

In further embodiments, the oxidant may include an organic hydroperoxide, an organic peroxide, or combinations thereof.

In embodiments, the catalyst includes a transition metal catalyst, i.e. a metal catalyst comprising metals from IUPAC Groups 4-12 of the Periodic Table, including Ti, V, Mn, Co, Fe, Cr, Cu, Zn, W and Mo. In further embodiments the transition metal catalyst may include an active species comprising Mo (VI), W (VI), V (V), Ti (IV), or combinations thereof. In embodiments, the catalyst is a homogenous catalyst. In embodiments, the catalyst may be a heterogeneous catalyst. In embodiments, the catalyst has a pore volume in the range of from 0.2 to 1.2 cc/g, a total surface area in the range of from 20 to 800 m 2/g, and an average pore diameter in the range of from 2 to 1000 nm.

In further embodiments, the Lewis acidity and the oxidation potential of the catalyst are important parameters. If the catalyst has a high oxidation potential then it will decompose the oxidant. Although not wishing to be bound to a specific theory, the reaction mechanism appears to include the Lewis acid metal forming a complex with the reactant disulfides and peroxides, which complex then becomes an active species.

As previously stated, a phase transfer agent may be present in the oxidant mixture. As a non-limiting example, a phase transfer agent may be used when the catalyst is not soluble in at least one of the oxidant and the disulfide oil. In embodiments, the phase transfer agent may include formic acid, acetic acid, or combinations thereof. In embodiments where the oxidizing agent is hydrogen peroxide, the acetic acid or formic acid might react with the hydrogen peroxide to produce peracetic acid, or performic acid, respectively. Without intending to be bound by a particular theory, formic acid or acetic acid may help the oxidizing agent be soluble in the same phase as the reactants. In embodiments, the total composition of the oxidant mixture and disulfide oil may include from 6.5 wt. % to 7.5 wt. %, 6 wt % to 8 wt. %, 5 wt. % to 9 wt. %, 5 wt. % to 10 wt. %, 1 wt. % to 10 wt. %, 0 wt. % to 10 wt. %, 1 wt. % to 15 wt. %, or 0 wt. % to 15 wt. % acetic acid based on a total weight of the total composition of the oxidant mixture and disulfide oil. In embodiments, the total composition of the oxidant mixture and disulfide oil may include from 7.5 wt. % to 9 wt. %, 7 wt. % to 9 wt. %, 7 wt. % to 10 wt. %, 1 wt. % to 10 wt. %, 0 wt. % to 10 wt. %, 1 wt. % to 15 wt. %, or 0 wt. % to 15 wt. % acetic acid based on a total weight of the oxidant mixture.

As previously disclosed, the method includes spraying the oxidant mixture onto the contaminated soil. In embodiments, spraying the oxidant mixture onto the contaminated soil includes applying the oxidant mixture to the contaminated soil by providing a continuous flow of oxidant mixture to the soil. In embodiments, the oxidant mixture is applied to the contaminated soil by spraying the oxidant mixture onto the soil using any means that allows droplets of the oxidant mixture to fall onto the soil. In embodiments, the oxidant mixture is applied by injecting the oxidant mixture into the contaminated soil. As a non-limiting example, the oxidant mixture might be placed in a container or tank that is connected to tubing. Pressure might be used to force the oxidant mixture into the tubing, and then the oxidant mixture might be released out of the tubing so that the oxidant mixture falls on the soil in droplets. An apparatus that allows control of the size of the droplets released from the tubing could be attached to the tubing to control the droplet size of the oxidant mixture.

The method further includes washing the contaminated soil with a washing solution. In embodiments, washing the contaminated soil with a washing solution may include moving the contaminated soil to a staging area where it is prepared for treatment. In embodiments, preparing the soil for treatment includes sifting or sieving the soil through a sieve, mesh, or other soil separating apparatus to remove debris and large objects. In embodiments, the debris and large objects might be rocks, organic waste, or glass. In further embodiments, the soil that has been prepared enters a soil scrubbing unit and the soil is mixed with a washing solution and agitated. In embodiments, the washing solution may include water. In embodiments, the washing solution may include additives, like detergent or surfactants, which remove contaminants from the soil. In embodiments, the surfactants may comprise nonionic, anionic, cationic, or zwitterionic substances. In embodiments, the nonionic substances may comprise at least one of polyethoxylated sorbitol esters, and alkyl phenols. In embodiments, the anionic substances comprise at least one of alkylated diphenyl-oxide disulfonates, alkylbenzene monosulfonates, alkyl sulfates, and alkyl ether sulfates. In embodiments, the alkylbenzene monosulfonates comprise sodium dodecyl benzene sulfonate. In embodiments, the alkyl sulfates comprise sodium dodecyl sulfate. In embodiments, the washing solution is drained out of the soil scrubbing unit after the soil and washing solution have been agitated and the soil is rinsed with clean water by further agitating the soil and the clean water and then draining the clean water. In embodiments, heavier sand and gravel particles in the processed soil may settle out and may be tested for contaminants. If testing does not reveal the presence of any contaminants, the processed soil may be returned to the original site where it was dug up, or may be taken elsewhere to be deposited. If testing reveals that traces of contaminants are still present, the material may be run through the soil washer again, or collected for alternate treatment, or off-site disposal. In embodiments, silt and clay in the contaminate soil settle out and are then separated from the washing solution. In embodiments, the washing solution, which now also includes contaminants, is optionally treated by wastewater treatment processes so it can be recycled for further use. In embodiments, the washing solution may include additives, some of which may interfere with the wastewater treatment process. If the washing solution includes additives that interfere with the wastewater treatment process, the additives must be removed or neutralized before the washing solution goes to wastewater treatment. Once separated from the washing solution, the silt and clay are tested for contaminants. If testing does not reveal the presence of any contaminants, the processed soil may be returned to the original site where it was dug up, or may be taken elsewhere to be deposited. If testing reveals that traces of contaminants are still present, the material may be run through the soil washer again, or collected for alternate treatment, or off-site disposal.

As an additional non-limiting example of soil washing, the contaminated soil might be washed with a washing solution by allowing the washing solution to pass through the soil. As the washing solution passes through the contaminated soil, the washing solution may allow contaminants to be dissolved in the washing solution. In embodiments, injection wells and extraction wells are drilled into the contaminated soil so that the washing solution can be applied to the contaminated soil by injecting the washing solution directly into the injection wells. The washing solution may then pass through the contaminated soil. As the washing solution passes through the contaminated soil, the washing solution may allow contaminants to be dissolved in the washing solution. The washing solution and any dissolved contaminants may then be removed from the extraction wells.

In embodiments, the washing solution includes water. The water may include deionized, tap, distilled or fresh waters; natural, brackish and saturated salt waters; natural, salt dome, hydrocarbon formation produced or synthetic brines; filtered or untreated seawaters; mineral waters; and other potable and non-potable waters containing one or more dissolved salts, minerals or organic materials. It is contemplated that fresh water may be beneficial because it may avoid potential issues with introducing unnecessary amounts of ions, metals and minerals to the contaminated soil.

In embodiments, vacuum pipes are inserted into the contaminated soil by placing the vacuum pipes on the surface of the contaminated soil or completely or at least partially below the surface of the contaminated soil. In embodiments, the vacuum pipes remove the washing solution completely or at least partially from the contaminated soil by vacuuming the washing solution. In embodiments, the washing solution vacuumed off of the contaminated soil may include the oxidation mixture, catalyst, contaminants, or oxidation products. In embodiments, the vacuuming may remove all of the contaminants from the contaminated soil so that the contaminated soil is no longer contaminated.

In embodiments, the contaminated soil may be analyzed to determine a contaminant concentration in the contaminated soil. In embodiments, X-ray fluorescence (XRF) may be used to determine the contaminant concentration in the contaminate soil. As a non-limiting example, a contaminated soil may be irradiated with X-rays to dislodge electrons from individual atom's inner orbital shells. Other electrons from the respective individual atom's higher energy orbital shells fill the vacancy left behind by the dislodged electrons. As the electron's from the higher energy orbital shells fill the vacancy, they drop to a lower energy state and release fluorescent X-rays. The released fluorescent X-rays can then be analyzed to determine what elements are present in the contaminated soil. In embodiments, XRF is used to determine the contaminant concentration using the procedure described by ASTM International designation number ASTM D2622. In embodiments, XRF is used to detect contaminant concentration using the procedure described by ASTM International designation number ASTM D4294. In embodiments, inductively coupled plasma (ICP) may be used to determine the contaminant concentration. In embodiments, CHNS analysis may be used to determine the contaminant concentration. In embodiments, CHNS analysis is used to detect contaminant concentration using the procedure described by ASTM International designation number ASTM D5291.

In further embodiments, the oxidant mixture has an oxidant concentration. In embodiments, the oxidant concentration is based on the contaminant concentration in the contaminated soil. In embodiments, the oxidant to contaminant mole ratio may be approximately 5:1, 4:1, 3:1, 2.5:1, 2.25:1, 2:1, 1.75:1, 1.5:1, 1:1, or any range combination between the aforementioned ratios. In embodiments, the oxidant to contaminant mole ratio may be approximately 4:1. In embodiments, the oxidant to contaminant mole ratio may be approximately 2:1. As a non-limiting example, if the concentration of contaminant was found to be 0.005 moles per kilogram (mol/kg) of soil, then then 0.010 mol of oxidant would need to be added per kilogram (kg) of contaminated soil to be treated, as the number of moles of oxidant would need to be twice the number of moles of contaminant. The oxidant could then be dissolved in 0.1 liters (L) of water along with the oxidant to create a 0.1 (moles per liter of solution) M oxidant mixture. 0.1 L of the 0.1 M oxident mixture to each kg of contaminated soil to be treated.

In embodiments, the oxidant mixture is transferred into a disperser before applying the mixture to the contaminated soil. As a non-limiting example of the disperser and its use, the oxidant mixture may be placed into a container or tank. In embodiments, the container or tank may be attached to pipes or tubing, and the oxidant mixture may move out of the container or tank into the pipes or tubing. Once in the pipes or tubing, the oxidant mixture may then exit the pipes or tubing to apply the oxidant mixture into the soil. In embodiments, the oxidant mixture may be sprayed onto the soil when it exits the pipes or tubing. In further embodiments, the oxidant mixture might be sprayed onto the contaminated soil directly from the container or tank. In embodiments, the oxidant mixture might be applied to the contaminated soil directly from the container or tank. In further embodiments, the oxidant mixture may be injected directly into the contaminated soil when it exits the pipes or tubing. In embodiments, the oxidant mixture might be injected into the contaminated soil directly from the container or tank. In embodiments, the injection sites in the contaminated soil may be spaced apart. In embodiments, different amounts of oxidant mixture may be added to different locations in the contaminated soil depending on contaminant concentration of each particular contaminated soil location. In further embodiments, the disperser operates mechanically.

In embodiments, the contaminated soil may include disulfides. In further embodiments, the contaminated soil may include sulfides and disulfides. In embodiments, the contaminated soil may include sulfides in minor proportion and disulfides in major proportion. In embodiments, the contaminated soil may include disulfide oil. In embodiments, the contaminated soil may include sulfoxides and sulfones. In further embodiments, the contaminated soil may include oxidized disulfides comprising at least one oxygen atom.

Disulfide oils are a byproduct of the mercaptan oxidation (MEROX) process, which is a process focused on the conversion of mercaptans by oxidation. The MEROX process is based on the ability of an organometallic catalyst to accelerate the oxidation of mercaptans to disulfides at near ambient temperatures and pressures. The overall reaction can be written:

$$RSH+RSH+\tfrac{1}{2}O_2 \rightarrow RSSR+H_2O \qquad (2)$$

In the above reaction, R represents the same or different alkyl, aryl, or alkylenearyl groups. These alkyl, aryl, or alkylenearyl groups may be saturated or unsaturated and may be straight, branched, or cyclic. This reaction occurs spontaneously, but at a very slow rate, whenever any mercaptan-bearing distillate is exposed to atmospheric oxygen. In addition, this reaction requires the presence of an alkyl solution, such as sodium hydroxide. This mercaptan oxidation proceeds at an economically practical rate at moderate refinery run down stream temperatures.

Disulfide oil is a byproduct of the MEROX process, and includes various sulfides. Disulfide oils may include disulfide or trisulfide structures with 2-3 sulfur atoms with the same or different short R chain components, such as dimethyl disulfide, methyl ethyl disulfide, and diethyl disulfide, as well as disulfides or trisulfides with R groups including up to 20 carbon atoms, or R groups including 20 or more carbon atoms, wherein the R groups may be the same or different alkyl, aryl, or alkylenearyl groups. Without intending to be bound by any particular theory, groups attached to the disulfide or disulfide structures may change the reactivity of the disulfide oils. Disulfide oils may be substantially free of chlorine atoms, phosphorous atoms, or nitrogen atoms, such that these chlorine atoms, phosphorous atoms, or nitrogen atoms, individually or jointly, are present in a concentration of less than or equal to 1 mg per liter of disulfide oil.

A MEROX unit designed for propane and butane yields a disulfide oil with the composition shown in Table 1. The composition of the disulfide oil was derived from semi-quantitative GC-MS data. The GC-MS data also provided evidence of trace quantities of tri-sulfide species; however, the majority of the disulfide soil stream includes the three components identified in Table 1. The quantitative total molecular sulfur content was determined by energy dispersive x-ray fluorescence spectroscopy and give as 63 wt. %.

TABLE 1

| Disulfide Oil | W % | BP | MW | Sulfur, W % |
|---|---|---|---|---|
| Di-Methyl Di-Sulfide | 15.7 | 110 | 94 | 68.1 |
| Di-Ethyl Di-Sulfide | 33.4 | 152 | 122 | 52.5 |
| Methyl Ethyl Di-Sulfide | 49.3 | 121 | 108 | 59.3 |
| Total | 98.4 | — | — | — |
| Average | — | 127.7 | 109 | 57.5 |

Disulfide oil is a yellow liquid that has an extremely foul and obnoxious odor. Disulfide oil is highly flammable with a moderately high vapor pressure and low water solubility. The low water solubility makes it exceedingly difficult to remove disulfide oil from contaminated soil by washing the contaminated soil with water. Select chemical and physical properties of disulfide oil as disclosed in David Morgott et al, *Disulfide Oil Hazard Assessment Using Categorical Analysis and a Mode of Action Determination*, 33 INT'L J. TOXICOLOGY 181S (2014), are shown in Table 2.

TABLE 2

| Property | Unit | Value |
|---|---|---|
| Flashpoint (closed cup) | ° C. | 17.8 |
| Lower explosive limit | % | 1 |
| Upper explosive limit | % | 7.6 |
| Autoignition temperature | ° C. | 219.4 |
| Vapor pressure @37.8° C. | mmHG at 37.8° C. | 56.9 |
| Viscosity @40° C. | cSt | 0.58 |
| Vapor specific gravity | — | 4.7 |
| Average boiling point | ° C. | 127.69 |
| Water solubility | g/L | <0.1 |
| Specific Gravity | 15.6/15.6° C. | 1.052 |
| Molecular Weight | G/G-mol | 109 |
| Sulfur | Wt % | 57.5 |

Since disulfide oil has an obnoxious odor, it can create an odor problem if it is spilled. Therefore, any spilled disulfide oil must be removed from soil.

Since disulfide oil has a low solubility in water, it cannot be easily removed with water-based soil remediation systems, and non-water-based soil remediation systems often produce organic or other waste that is expensive to safely dispose. Oxidizing the disulfide oil to create a more polar product solves this problem by allowing the oxidized disulfide oil to more easily dissolve in water.

In the presences of an oxidant and a catalyst, disulfide oil is oxidized into sulfoxides, disulfoxides, sulfones, sulfonates, sulfinates, and disulfones that are entirely or partially water soluble. As a non-limiting example, when in the presence of an oxidant and a catalyst, a disulfide oil may be oxidized as shown in the following reaction:

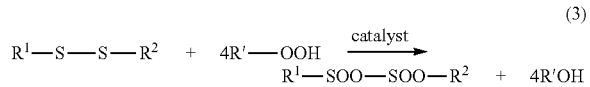

(3)

In the above reaction, $R^1$ and $R^2$ represents the same or different alkyl, aryl, or alkylenearyl groups and R' represents, hydrogen, an alkyl group, an aryl group, or an alkylenearyl group In embodiments, the catalyst may be added at a quantity of about 0.0015 weight percent to about 1 weight percent based on the mass flow rate of the sulfides and disulfides. In embodiments, the catalyst may be added in a quantity of about 0.005 weight percent to about 0.5 weight percent based on the combined weight of the sulfides and disulfides. In further embodiments, the catalyst may be added in a quantity of about 0.005 weight percent to about 0.1 weight percent based on the weight of the disulfides.

In embodiments, the moles of oxidant to moles of molecular sulfur ratio ranges from 1.5:1 to 10:1, from 2:1 to 10:1, from 2.5 to 10:1, from 3:1 to 10:1, from 3.5:1 to 10:1, from 4:1 to 10:1, from 4.5:1 to 10:1, from 5:1 to 10:1, from 6:1 to 10:1, from 7:1 to 10:1, from 8:1 to 10:1, from 9:1 to 10:1, from 1.5:1 to 9:1, from 2:1 to 9:1, from 2.5 to 9:1, from 3:1 to 9:1, from 3.5:1 to 9:1, from 4:1 to 9:1, from 4.5:1 to 9:1, from 5:1 to 9:1, from 6:1 to 9:1, from 7:1 to 9:1, from 8:1 to 9:1, from 1.5:1 to 8:1, from 2:1 to 8:1, from 2.5 to 8:1, from 3:1 to 8:1, from 3.5:1 to 8:1, from 4:1 to 8:1, from 4.5:1 to 8:1, from 5:1 to 8:1, from 6:1 to 8:1, from 7:1 to 8:1, from 1.5:1 to 7:1, from 2:1 to 7:1, from 2.5 to 7:1, from 3:1 to 7:1, from 3.5:1 to 7:1, from 4:1 to 7:1, from 4.5:1 to 7:1, from 5:1 to 7:1, from 6:1 to 7:1, from 1.5:1 to 6:1, from 2:1 to 6:1, from 2.5 to 6:1, from 3:1 to 6:1, from 3.5:1 to 6:1, from 4:1 to 6:1, from 4.5:1 to 6:1, from 5:1 to 6:1, from 1.5:1 to 5:1, from 2:1 to 5:1, from 2.5 to 5:1, from 3:1 to 5:1, from 3.5:1 to 5:1, from 4:1 to 5:1, from 4.5:1 to 5:1, from 1.5:1 to 4.5:1, from 2:1 to 4.5:1, from 2.5 to 4.5:1, from 3:1 to 4.5:1, from 4:1 to 4.5:1, from 4:1 to 4.5:1, from 1.5:1 to 4:1, from 2:1 to 4:1, from 2.5 to 4:1, from 3:1 to 4:1, from 3.5:1 to 4:1, from 1.5:1 to 3.5:1, from 2:1 to 3.5:1, from 2.5 to 3.5:1, from 3:1 to 3.5:1, from 1.5:1 to 3:1, from 2:1 to 3:1, from 2.5 to 3:1, from 1.5:1 to 2.5:1, from 2:1 to 2.5, and from 1.5:1 to 2:1. When the moles of oxidant to moles of molecular sulfur ratio is 1.5:1, 3 moles of oxidant are present for every 2 moles of molecular sulfur present. As a non-limiting example, the oxidant mixture might include 3 moles of hydrogen peroxide as the oxidant, and the soil contaminant might include 1 mole of dimethyl disulfide as the only sulfur including species, which would result in the moles of oxidant to moles of molecular sulfur ratio being 1.5:1, as dimethyl disulfide includes two moles of molecular sulfur per mole of dimethyl disulfide.

EXAMPLE

The present disclosure will be better understood by reference to the following example, which are offered by way of illustration and which one skilled in the art will recognize are not meant to be limiting.

Example 1

In Example 1, 10 grams (g) of Saudi Arabian sand was placed within a beaker to which 0.57 g of disulfide oil was added. The disulfide oil included 15.7 weight percent (wt. %) dimethyl disulfide, 33.4 wt. % diethyl disulfide, 49.3 wt. % methyl ethyl disulfide, and trace amounts of trisulfide species, not totaling more than 1.6 wt. %. Separately, 0.485 g acetic acid, available from the manufacturer Fisher Scientific, as a phase transfer agent, 0.013 g sodium tungstate ($Na_2WO_4$), available from the manufacturer Sigma Aldrich, as a catalyst, and 6.037 g of 30% hydrogen peroxide, available from the manufacturer VWR, as an oxidizing agent were mixed to create an oxidant mixture.

A 3.75 g portion of the acetic acid/sodium tungstate/hydrogen peroxide solution was applied to the sand and disulfide oil.

Visual observation indicated that a two-layer system was present: a yellow top layer of disulfide oil and a clear bottom layer of acetic acid, sodium tungstate, and hydrogen peroxide.

The beaker was shaken to simulate soil washing, and after about 5 minutes (min), the beaker became warm to the touch. Visual observation further indicated that the yellow top layer of disulfide oil was no longer present, which indicated that the disulfide oil had been oxidized.

For the purposes of describing and defining the present disclosure it is noted that the term "substantially" is used herein to represent the inherent degree of uncertainty that may be attributed to any quantitative comparison, value, measurement, or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

Unless otherwise defined, all technical and scientific terms used herein have the same meaning as would be understood by one of ordinary skill in the art to which the disclosure belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

The term "independently selected from," as used in the specification and appended claims, is intended to mean that the referenced groups can be the same, different, or a mixture thereof, unless the context clearly indicates otherwise. Thus, under this definition, the phrase "$X^1$, $X^2$, and $X^3$ are independently selected from noble gases" would include the scenario where $X^1$, $X^2$, and $X^3$ are all the same, where $X^1$, $X^2$, and $X^3$ are all different, and where $X^1$ and $X^2$ are the same but $X^3$ is different.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present disclosure. Notwithstanding that the numerical ranges and parameters setting forth the broad scope of the disclosure are approximations, the numerical values set forth in the specific examples are reported as precisely as possible. One of ordinary skill in the art will understand that any numerical values inherently contain certain errors attributable to the measurement techniques used to ascertain the values.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method for treating soil contaminated with sulfides and disulfides, the method comprising:
   analyzing the soil contaminated with sulfides and disulfides to determine the sulfide and disulfide concentrations;
   determining an oxidant concentration present in an oxidant mixture based on the sulfide and disulfide concentrations;
   mixing the determined amount of oxidant, and a catalyst to form the oxidant mixture;
   applying the oxidant mixture onto the contaminated soil;
   washing the contaminated soil with a washing solution;
   inserting vacuum pipes into the contaminated soil; and
   vacuuming the contaminated soil to remove at least one of the oxidant mixture, contaminants, or oxidation products, thereby treating the contaminated soil.

2. The method of claim 1 further comprising transferring the oxidant mixture into a disperser before applying the oxidant mixture onto the contaminated soil.

3. The method of claim 1 wherein the washing solution comprises water.

4. The method of claim 1 wherein the oxidant comprises a peroxide, a peroxy acid, oxygen, air, nitrous oxide, or a combination thereof.

5. The method of claim 4 wherein the peroxide comprises an alkyl hydroperoxide, an aryl hydroperoxide, a dialkyl peroxide, a diaryl peroxide, a perester, hydrogen peroxide, or combinations thereof.

6. The method of claim 4 wherein:
   the peroxide has a general structure according to Formula I; and

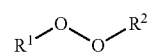

Formula I $R^1$ is hydrogen, an alkyl group, an aryl group, or an alkylenearyl group, and $R^2$ hydrogen, an alkyl group, an aryl group, or an alkylenearyl group, and where $R^1$ and $R^2$ are the same or different.

7. The method of claim 5 wherein:
   the perester has the general structure according to Formula II; and

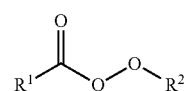

Formula II where $R^1$ is hydrogen, an alkyl group, an aryl group, or an alkylenearyl group, and $R^2$ hydrogen, an alkyl group, an aryl group, or an alkylenearyl group, and where $R^1$ and $R^2$ are the same or different.

8. The method of claim 5 wherein the oxidant comprises an organic hydroperoxide, an organic peroxide, or combinations thereof.

9. The method of claim 1 wherein the catalyst comprises a transition metal catalyst.

10. The method of claim 9 wherein the transition metal catalyst comprises an active species comprising Mo (VI), W (VI), V (V), Ti (IV), or combinations thereof.

11. The method of claim 1 wherein the mixing step further comprises mixing a phase transfer agent with the oxidant and the catalyst to form the oxidant mixture.

12. The method of claim 11 wherein the phase transfer agent comprises formic acid, acetic acid, or combinations thereof.

13. The method of claim 1 wherein the disulfides comprises disulfide oil.

14. The method of claim 13 wherein the catalyst is added in a quantity of about 0.005 weight percent to about 1 weight percent based on the combined weight of the sulfides and disulfides.

15. The method of claim 1 wherein the soil further comprises sulfoxides and sulfones.

16. The method of claim 1 wherein the disulfides comprise oxidized disulfides comprising at least one oxygen atom.

17. The method of claim 13 wherein a ratio of moles of oxidant to moles of molecular sulfur ranges from 1.5:1 to 10:1.

18. A method for treating soil contaminated with sulfides and disulfides, the method comprising:
  analyzing the soil contaminated with sulfides and disulfides to determine the sulfide and disulfide concentrations;
  determining an oxidant concentration present in an oxidant mixture based on the sulfide and disulfide concentrations;
  mixing the determined amount of oxidant, a catalyst, and optionally a phase transfer agent to form an oxidant mixture;
  transferring the oxidant mixture into a disperser;
  applying the oxidant mixture onto the contaminated soil;
  washing the contaminated soil with water;
  inserting vacuum pipes into the contaminated soil; and
  vacuuming the contaminated soil to remove at least one of the oxidant mixture, contaminants, or oxidation products, thereby treating the contaminated soil.

* * * * *